(12) United States Patent
Burra et al.

(10) Patent No.: US 9,473,057 B2
(45) Date of Patent: Oct. 18, 2016

(54) SYSTEM AND METHOD FOR WIND POWER DISPATCH IN A WIND FARM

(71) Applicant: General Electric Company, Schenectady, NY (US)

(72) Inventors: Ranji Kant Burra, Bangalore (IN); Minesh Ashok Shah, Schenectady, NY (US); Govardhan Ganireddy, Bangalore (IN); Victor Robert Abate, Schenectady, NY (US); Venkatarao Ryali, Bangalore (IN); Akshay Ambekar, Bangalore (IN)

(73) Assignee: General Electric Company, Schenectady, NY (US)

( * ) Notice: Subject to any disclaimer, the term of this patent is extended or adjusted under 35 U.S.C. 154(b) by 495 days.

(21) Appl. No.: 14/051,551

(22) Filed: Oct. 11, 2013

(65) Prior Publication Data

US 2014/0103655 A1    Apr. 17, 2014

(30) Foreign Application Priority Data

Oct. 12, 2012   (IN) ............................. 4275/CHE/2012

(51) Int. Cl.
| | |
|---|---|
| H02J 1/10 | (2006.01) |
| H02P 9/00 | (2006.01) |
| F03D 7/02 | (2006.01) |
| F03D 7/04 | (2006.01) |

(52) U.S. Cl.
CPC ................ *H02P 9/00* (2013.01); *F03D 7/028* (2013.01); *F03D 7/048* (2013.01); *F03D 9/11* (2016.05); *F05B 2260/821* (2013.01); *F05B 2260/8211* (2013.01); *F05B 2270/32* (2013.01); *F05B 2270/335* (2013.01); *Y02E 10/723* (2013.01)

(58) Field of Classification Search
CPC ..... Y02E 10/723; F03D 7/028; F03D 7/048; F03D 9/021; F05B 2260/821; F05B 2260/8211; F05B 2270/32; F05B 2270/335; H02P 9/00
USPC .......................................................... 307/40
See application file for complete search history.

(56) References Cited

U.S. PATENT DOCUMENTS

| | | |
|---|---|---|
| 767,481 A | 8/1904 | Hogan |
| 6,963,802 B2 | 11/2005 | Enis et al. |
| 7,345,373 B2 | 3/2008 | Delmerico et al. |
| 7,430,534 B2 | 9/2008 | Lof et al. |
| 7,523,001 B2 | 4/2009 | Morjaria et al. |
| 7,613,548 B2 | 11/2009 | Cardinal et al. |

(Continued)

FOREIGN PATENT DOCUMENTS

| | | |
|---|---|---|
| EP | 2230403 | 9/2010 |
| WO | 2009010771 | 1/2009 |
| WO | 2011000531 A2 | 1/2011 |

*Primary Examiner* — Jared Fureman
*Assistant Examiner* — Duc M Pham
(74) *Attorney, Agent, or Firm* — Douglas D. Zhang; Global Patent Operation

(57) ABSTRACT

A system for wind power dispatch that includes a wind farm controller for controlling operation of wind turbines in a wind farm and regulating real time power output of the wind farm. The system also includes a wind power dispatch management system for computing a difference between a predefined power output and the real time power output and dispatching a transient wind farm reserve to reduce the difference or, if the transient wind farm reserve is insufficient to reduce the difference, additionally or alternatively dispatching a storage reserve to reduce the difference.

15 Claims, 4 Drawing Sheets

(56) References Cited

U.S. PATENT DOCUMENTS

| | | |
|---|---|---|
| 7,679,215 B2 | 3/2010 | Delmerico et al. |
| 7,941,246 B2 | 5/2011 | Miller et al. |
| 7,991,512 B2 | 8/2011 | Chandra et al. |
| 8,046,110 B2 | 10/2011 | Mayor et al. |
| 8,150,641 B2 | 4/2012 | Morjaria et al. |
| 2009/0194995 A1 | 8/2009 | Delmerico et al. |
| 2009/0281675 A1* | 11/2009 | Rasmussen ............ F03D 7/047 700/287 |
| 2010/0011595 A1 | 1/2010 | Claus et al. |
| 2010/0115951 A1 | 5/2010 | Pedersen |
| 2010/0131216 A1 | 5/2010 | Pedersen |
| 2010/0138058 A1* | 6/2010 | Kirchner ............... F03D 7/0284 700/286 |
| 2011/0074151 A1 | 3/2011 | Burra et al. |
| 2011/0144816 A1* | 6/2011 | Morjaria ............... F03D 7/0276 700/287 |
| 2011/0295438 A1* | 12/2011 | Rogers ................. F03D 7/0204 700/287 |
| 2012/0053750 A1 | 3/2012 | Viassolo et al. |
| 2014/0316592 A1* | 10/2014 | Haj-Maharsi ......... F03D 7/0284 700/287 |
| 2015/0275862 A1* | 10/2015 | Babazadeh ............... H02J 3/18 290/44 |

* cited by examiner

SYSTEM AND METHOD FOR WIND POWER DISPATCH IN A WIND FARM

BACKGROUND OF THE INVENTION

The invention relates generally to wind turbines and more particularly to a system and method for wind power dispatch in a wind farm.

Wind farms include wind turbines spread over a large area of land that harness wind energy to generate power for utility purposes. Wind farms are coupled to a grid with each farm expected to provide a predefined or forecasted amount of power at a fixed power rating to the grid. However, due to the uncontrollable variations in the wind energy, such as wind speed, it is difficult to continuously provide the predefined amount of power at the fixed power ratings, and there is always some difference between the power supplied from the wind farm and the predefined amount of power.

One approach for compensation in a situation where a wind farm is unable to supply the required power is to buy power either neighboring control areas or reserve generators. Another approach is to use supplementary energy storage in the wind farm. However, each of the approaches increases cost of power generated by the wind farms and thus results in higher costs to consumers or losses to power generation organizations. For example, the use of supplementary energy storage creates additional installation, operating, and maintenance costs.

Hence, there is a need for an improved system to address the aforementioned issues.

BRIEF DESCRIPTION OF THE INVENTION

Briefly, in accordance with one embodiment, a system for wind power dispatch is provided. The system includes a wind farm controller for controlling operation of wind turbines in a wind farm and regulating real time power output of the wind farm. The system also includes a wind power dispatch management system for computing a difference between a predefined power output and the real time power output and dispatching a transient wind farm reserve to reduce the difference or, if the transient wind farm reserve is insufficient to reduce the difference, additionally or alternatively dispatching a storage reserve to reduce the difference.

In another embodiment, a wind power dispatch management system is provided and includes: a transient wind farm reserve management system for estimating a transient wind farm reserve in a wind farm; a storage reserve management system for estimating a storage reserve in the wind farm; and a controller for computing a difference between a predefined power output and a real time power output of the wind farm and dispatching the transient wind farm reserve to reduce the difference or, if the transient wind farm reserve is insufficient to reduce the difference, additionally or alternatively dispatching the storage reserve to reduce the difference.

In yet another embodiment, a method for wind power dispatch in a wind farm is provided. The method includes forecasting a wind speed; determining a transient wind farm reserve based on the forecasted wind speed; determining a storage reserve in the wind farm; computing a difference between a predefined wind farm power output and a real time power output; and dispatching the transient wind farm reserve to reduce the difference or, if the transient wind farm reserve is insufficient to reduce the difference, additionally or alternatively dispatching the storage reserve to reduce the difference.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Embodiments of the present invention include a system for wind power dispatch that includes a wind farm controller that controls operations of wind turbines in a wind farm and regulates real time power output of the wind farm. The system also includes a wind power dispatch management system that further includes a transient wind farm reserve management system which estimates a transient wind farm reserve in the wind farm. The wind power dispatch management system also includes a storage reserve management system that estimates a storage reserve in the wind farm. The wind power dispatch management system further includes a controller that computes a difference between a predefined power output and a real time power output of the wind farm and dispatches the transient wind farm reserve to reduce the difference or, if the transient wind farm reserve is insufficient to reduce the difference, the controller additionally or alternatively dispatches the storage reserve to reduce the difference.

Figure 1:
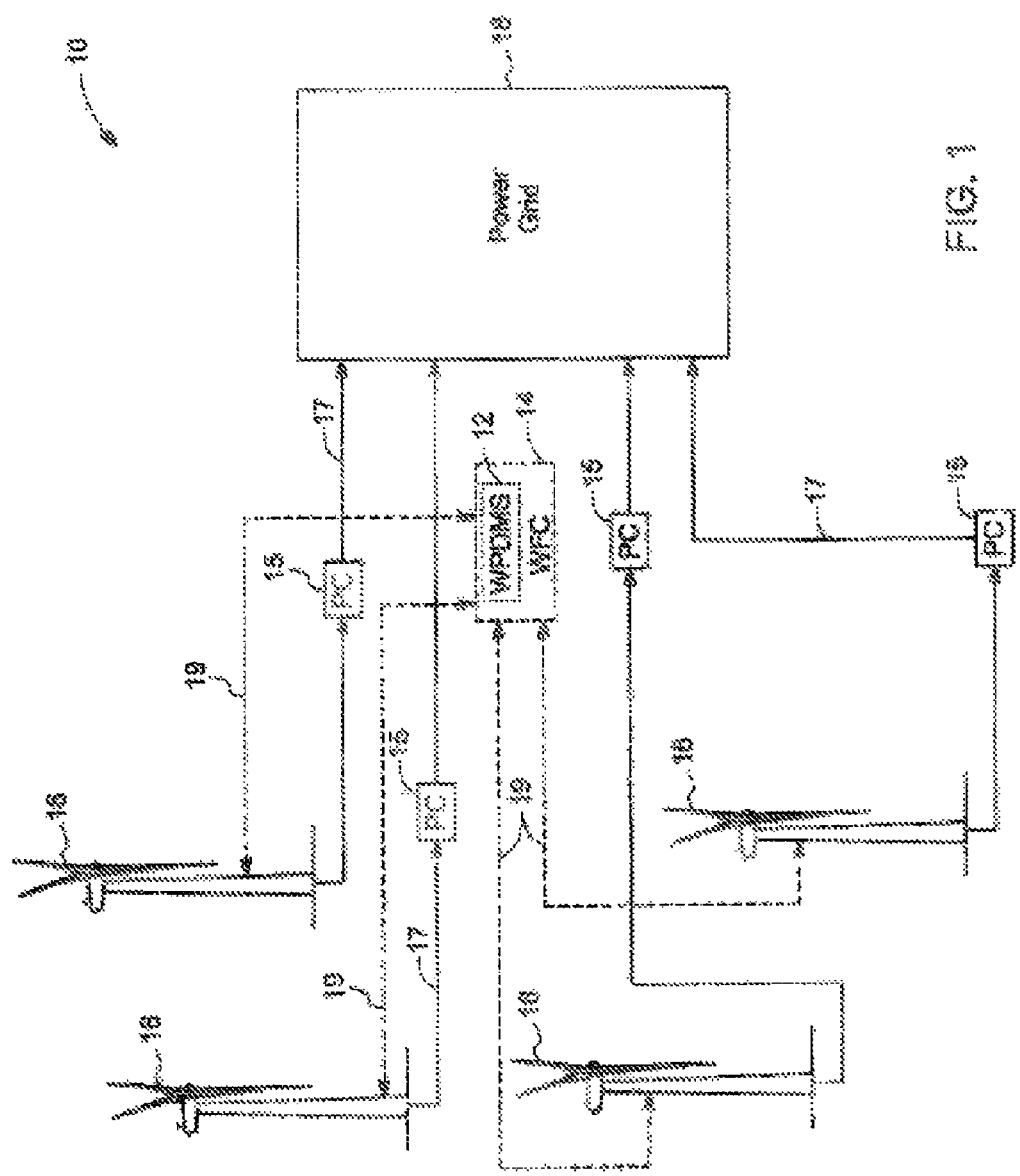
FIG. 1 is a schematic representation of a wind farm including a wind power dispatch management system situated inside a wind farm controller in accordance with an embodiment of the invention.

FIG. 1 is a schematic representation of a wind farm 10 including a wind power dispatch management system 12 situated inside a wind farm controller 14 in accordance with an embodiment of the invention. The wind farm 10 includes multiple wind turbines 16, and each wind turbine 16 individually generates wind power from wind energy available at the respective wind turbine 16. Each of the wind turbines 16 are coupled to a respective power converter 15 that converts the wind power generated by the wind turbines 16 to a usable power that may be transmitted to a power grid 18. Each of the wind turbines 16 is coupled to the power grid 18 through the power converter 15 and transmits the usable power converted by the respective power converters 15 to the power grid 18 as represented by solid lines with reference numeral 17. The amount of wind power generated by a respective wind turbine 16 depends on the wind energy available at the location of the respective wind turbine 16, as the wind speed may vary at different locations in the wind farm 10.

The wind turbines 16 are communicatively coupled to the wind farm controller 14 that controls the operations of the wind turbines 16 (as represented by dashed lines with reference numeral 19) based on various requirements and inputs provided by sensors and/or an operator (not shown). Although a control unit is illustrated as the wind farm controller 14 in FIGS. 1-3 for purposes of example, in some embodiments each wind turbine has a local controller that is coupled to a central or supervisory controller. As used herein "controller" may include either single control unit or multiple control unit embodiments. The wind farm controller 14 is coupled to the wind power dispatch management system 12 that controls the amount of wind power generated by the wind turbines 16 to meet the power grid requirements such as power schedule submitted to the power grid at any given moment. In the embodiment of FIG. 1, the wind power dispatch management system 12 is situated within the wind farm controller 14; however, the wind power dispatch management system 12 may alternatively be situated outside the wind farm controller 14 as represented in FIG. 3.

Figure 2:
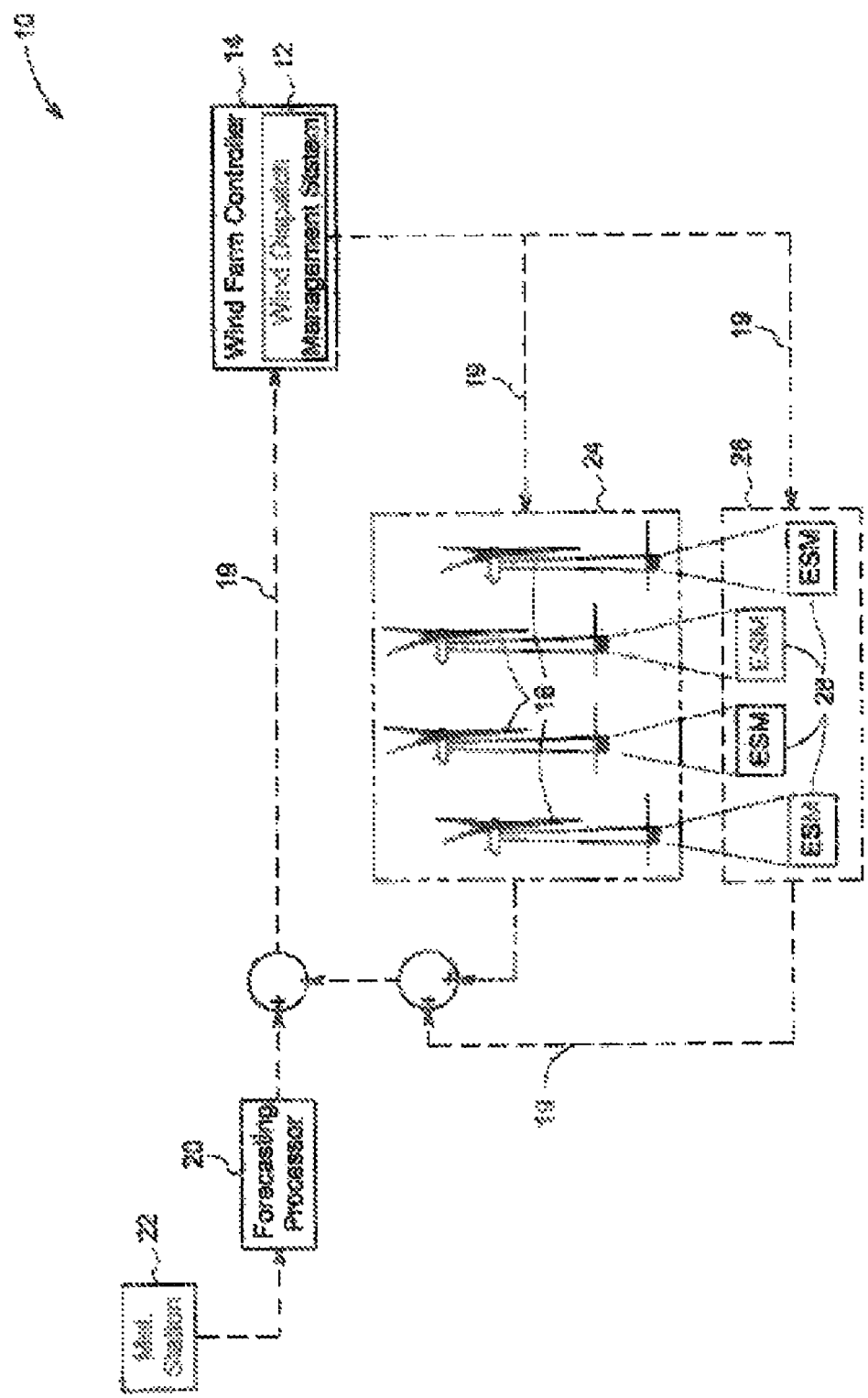
FIG. 2 is a schematic representation of a wind farm depicting control signals used by a wind dispatch management system for controlling a wind power dispatch in a wind farm in accordance with an embodiment of the invention.
Figure 3:
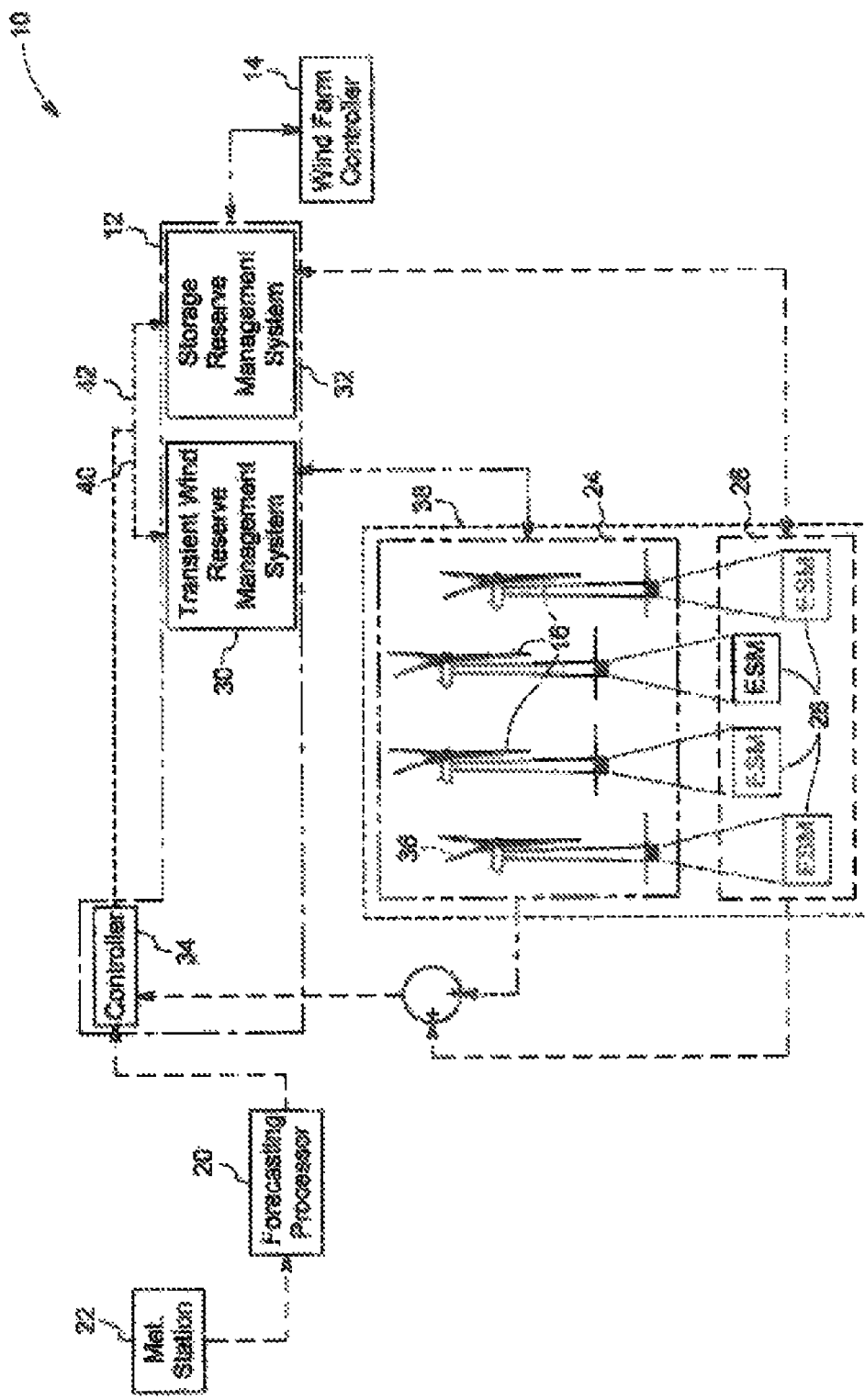
FIG. 3 is a schematic representation of a wind farm including a detailed view of a wind power dispatch management system coupled to a wind farm controller for controlling a wind power dispatch in the wind farm in accordance with an embodiment of the invention.

FIG. 2 is a schematic representation of the wind farm 10 depicting control signals used by the wind dispatch management system 12 for controlling the wind power dispatch in the wind farm 10 in accordance with an embodiment of the invention. In the embodiment of FIG. 2, the wind power dispatch management system 12 is coupled to a forecasting processor 20 that forecasts a wind speed for a predefined interval of time and supplies the forecasted wind speed to the wind power dispatch management system 12. The forecasting processor 20 may be communicatively coupled to a remote meteorological station 22 and receive weather information from the meteorological station 22 to forecast the wind speed for the predefined intervals. Alternatively, the forecasting processor 20 may receive wind speed forecasting information from an external source. In one embodiment, the predefined intervals include time periods ranging from about 15 minutes to about 60 minutes. Since the wind speed may be different at different locations in the wind farm 10, the forecasting processor 20 in one embodiment may forecast the wind speed individually for at least some wind turbines 16 in the wind farm 10 based on the locations of the wind turbines 16 in the wind farm 10. The forecasting processor 20 transmits the forecasted wind speed or speeds to the wind power dispatch management system 12 that is communicatively coupled to each of the wind turbines 16 and computes a real time power output generated by the wind farm 10. The wind power dispatch management system 12 also determines a transient wind farm reserve 24 and a storage reserve 26 by communicating with each of the wind turbines 16 in the wind farm 10.

The transient wind farm reserve 24 may comprise a reserve power that may be generated by enhancing the power output of the wind turbines 16, a reserve power available by using the kinetic energy of the wind turbines 16, a reserve power that is available by using one or more curtailed wind turbines, or combinations thereof.

In one embodiment, the storage reserve 26 includes an energy storage medium 28 such as a battery. The energy storage medium 28 may be a centralized energy storage medium 28 for the entire wind farm 10 or may include plurality of energy storage mediums 28 coupled locally to respective wind turbines 16.

The wind power dispatch management system 12 computes a difference between the predefined power output and the real time power output. As used herein "predefined" power output may be constant or variable and means the power output that is required by the grid or any load drawing power from the wind farm. Based on the difference, the wind power dispatch management system 12 dispatches the transient wind farm reserve 24 to reduce the difference or, if the transient wind farm reserve 24 is insufficient to reduce the difference, the wind power dispatch management system 12 additionally or alternatively dispatches the storage reserve 26 to reduce the difference. The difference between the predefined power output and the real time power output includes a positive difference and a negative difference. During situations where the difference is negative, the wind dispatch management system 12 transmits a control signal to the storage reserve 26 to absorb the differential power. In some situations where the negative difference is greater than the storage reserve capability and the excess power generated by the wind turbines 16 cannot be stored in the energy storage mediums 28, the wind turbines 16 may be curtailed, and the curtailed wind turbines then form a part of the wind farm reserve 24 as discussed below.

FIG. 3 is a schematic representation of the wind farm 10 including a detailed view of the wind power dispatch management system 12 coupled to the wind farm controller 14 in accordance with a more specific embodiment of the invention. The wind power dispatch management system 12 includes a transient wind farm reserve management system 30, a storage reserve management system 32 and a dispatch controller 34 coupled to management systems 30 and 32.

In one embodiment, the transient wind farm reserve management system 30 estimates a transient wind farm reserve 24 in the wind farm 10 by estimating the reserve power that may be generated by temporarily enhancing the power output of the wind turbines 16. The transient wind farm reserve management system 30 may also schedule and distribute the power in the wind farm. In one exemplary embodiment, the power output of the wind turbines 16 may be enhanced by using a wind boost control mechanism to provide the reserve power. The wind boost control mechanism enables the wind turbines 16 to temporarily improve their operations depending on the wind speed and other site atmospheric conditions. The reserve power generated by enhancing the power output of the wind turbines 16 varies as a function of total wind farm power output and wind direction and may be averaged over all wind directions using a uniform wind rose, wherein the term "wind rose" is defined as a graphic tool used by meteorologists to give a succinct view of how wind speed and direction are typically distributed at a particular location.

The transient wind farm reserve management system 30 may additionally or alternatively estimate the reserve power that may be generated by using the kinetic energy of the rotors (not shown) of each of the wind turbines 16. In one embodiment, the reserve power may be generated by the kinetic energy of the rotor by using an inertia control mechanism. Short term under-frequency deviations in the wind turbine 16 require wind turbines 16 to increase real power output to reduce the frequency dips. The wind inertia control mechanism utilizes the mechanical inertia of the rotor to provide a temporary increase in electrical power output over a short period of time. The transient wind farm reserve management system 30 may be designed to recognize under-frequency events and utilize active power controls to command reserve power in the wind farm 10.

In addition to estimating the reserve power that may be generated by enhancing the power output of the wind turbines 16 and the reserve power that may be generated by using the kinetic energy of the rotors of each of the wind turbines 16, the transient wind farm reserve 24 may also include another power reserve that is generated by wind turbines 16 which are not fully operational in the wind farm 10 at a given instant. One such approach to provide the reserve power is wind reserve control mechanism. The wind reserve control approach includes one or more reserve wind turbines 36 that are not operated or are operated at less than full power if the wind farm 10 is operating at a rated power. Such turbines 36 are referred to as reserve turbines. During normal operations, when there is little or no difference between the predefined power output and the real time power output at the wind farm level, the reserve turbines 36 are either not operated or are operated at a curtailed mode. The transient wind farm reserve management system 30 may estimate the reserve power that may be generated by the reserve turbines 36 based on the wind speeds provided by the forecasting processor 20.

The transient wind farm reserve management system 30 estimates the total wind farm reserve 38 based on the various above mentioned estimated reserve powers and transmits the wind farm reserve power 38 to the controller 34 in the wind power dispatch management system 12.

The wind power dispatch management system 12 also includes the storage reserve management system 32 that estimates the storage reserve 26 in the wind farm 10. In one embodiment, the storage reserve 26 may include energy storage mediums 28. In more specific embodiment, the energy storage mediums 28 include batteries. In another embodiment, the storage reserve 26 may also include power generators (not shown) that may provide supplementary power to the wind farm 10. The storage reserve management system 32 communicates with the energy storage mediums 28, estimates the reserve power available in the energy storage mediums 28, and transmits the estimated storage reserve 26 to the controller 34.

The controller 34 receives the estimated transient wind farm reserve 24 and the estimated storage reserve 26 from the transient wind farm reserve management system 30 and the storage reserve management system 32 respectively. The controller 34 based on the computed difference between the predefined power output and the real time power output sends a wind reserve control command 40 to the transient wind farm reserve management system 30 to dispatch the wind farm reserve 38 for reducing the difference. In a specific embodiment, the controller 34 may generate a more specific command or commands to enhance the power output of the wind turbines 16, the reserve power available by using the kinetic energy of the wind turbines 16, and/or the reserve power that is available by using one or more curtailed wind turbines 36. In a more specific example, the controller 34 first chooses the power reserve that is generated by wind turbines 16 which are curtailed in the wind farm 10 at the given instant to reduce the difference and, if the difference is more than the power reserve that is generated by wind turbines 16 which are curtailed in the wind farm 10, the controller 34 then chooses to generate reserve power by enhancing the power output of the wind turbines 16. And/or, if the power from the curtailed wind turbines is insufficient, the controller 34 may choose to generate the reserve power available by using the kinetic energy of the wind turbines 16. In situations, where the difference between the predefined power output and the real time power output is more than the transient wind reserve 24, the controller 34 additionally or alternatively sends a storage reserve control command 42 to the storage reserve management system 32 to dispatch the storage reserve 26 to further reduce the difference.

Figure 4:
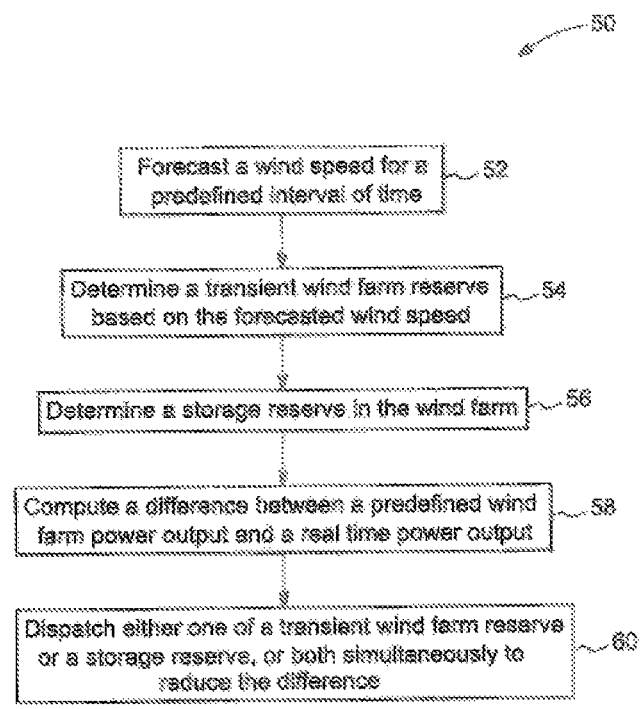
FIG. 4 is a flow chart representing steps involved in a method for dispatching power in a wind farm in accordance with an embodiment of the invention.

FIG. 4 is a flow chart representing steps involved in a method 50 for dispatching wind in a wind farm in accordance with an embodiment of the invention. The method 50 includes forecasting a wind speed in step 52. In one embodiment, forecasting the wind speed comprises forecasting the wind speed for a predefined interval wherein the predefined interval comprises a time period ranging from about 15 minutes to about 60 minutes. In another embodiment, forecasting the wind speed comprises forecasting the wind speed based on weather information received from a meteorological station. In a specific embodiment, forecasting the wind speed comprises individually forecasting the wind speed for at least some wind turbines in the wind farm. The method 50 also includes determining a transient wind farm reserve based on the forecasted wind speed in step 54. The method 50 further includes determining a storage reserve in the wind farm in step 56. In one embodiment, determining the storage reserve comprises computing a reserve power available in the storage reserve wherein the storage reserve comprises either one of a centralized energy storage medium for the wind farm or a plurality of local energy storage mediums each coupled to a respective one of the wind turbines. The method 50 also includes computing a difference between a predefined wind farm power output and a real time power output in step 58 and dispatching the transient wind farm reserve to reduce the difference or, if the transient wind farm reserve is insufficient to reduce the difference, additionally or alternatively dispatching the storage reserve to reduce the difference in step 60.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

What we claim is:

1. A wind power dispatch system comprising:
    a wind farm controller for controlling operation of wind turbines in a wind farm and regulating real time power output of the wind farm;
    a wind power dispatch management system for computing a difference between a predefined power output and the real time power output and dispatching a transient wind farm reserve to reduce the difference or, if the transient wind farm reserve is insufficient to reduce the difference, additionally or alternatively dispatching a storage reserve to reduce the difference; and
    a forecasting processor coupled to the wind power dispatch management system for supplying a forecasted wind speed to the wind power dispatch management system, wherein the wind power dispatch management system computes the total transient wind farm reserve from the forecasted wind for a predefined interval for use in determining whether and how to dispatch power from the transient wind farm reserve, the storage reserve, or both.

2. The wind power dispatch system of claim 1, wherein the storage reserve comprises one or more energy storage mediums.

3. The wind power dispatch system of claim 2, wherein the one or more energy storage mediums comprises one or more batteries.

4. The wind power dispatch system of claim 2, wherein each of the one or more energy storage mediums is coupled to a respective one of the wind turbines.

5. The wind power dispatch system of claim 1, wherein the forecasting processor forecasts the wind speed for at least some of the wind turbines individually.

6. The wind power dispatch system of claim 1, wherein the wind power dispatch management system is situated within the wind farm controller.

7. A wind power dispatch management system comprising:
   a transient wind farm reserve management system for estimating a transient wind farm reserve in a wind farm;
   a storage reserve management system for estimating a storage reserve in the wind farm; and
   a forecasting processor coupled to the transient wind farm reserve management system for supplying a forecasted wind speed to the transient wind farm reserve management system, wherein the transient wind farm reserve management system computes the total transient wind farm reserve from the forecasted wind for a predefined; and
   a controller for computing a difference between a predefined power output and a real time power output of the wind farm and dispatching the transient wind farm reserve to reduce the difference or, if the transient wind farm reserve is insufficient to reduce the difference, additionally or alternatively dispatching the storage reserve to reduce the difference.

8. The wind power dispatch management system of claim 7, wherein the storage reserve comprises one or more energy storage mediums.

9. The wind power dispatch management system of claim 8, wherein the one or more energy storage mediums comprise one or more batteries.

10. The wind power dispatch management system of claim 9, wherein each of the one or more energy storage mediums is coupled to a respective wind turbine.

11. The wind power dispatch management system of claim 7, wherein the forecasting processor forecasts the wind speed for at least some of the wind turbines individually.

12. The wind power dispatch management system of claim 7, wherein the wind power dispatch management system is situated within a wind farm controller.

13. A method for wind power dispatch in a wind farm having a plurality of wind turbines, the method comprising:
   with a forecasting processor, forecasting a wind speed based on weather information received communicated connected to the forecasting processor;
   with a transient wind farm reserve management system that is common to all of the wind turbines in the wind farm, determining a total transient wind farm reserve based on the forecasted wind speed;
   determining a storage reserve in the wind farm;
   computing a difference between a predefined wind farm power output and a real time power output; and
   dispatching the transient wind farm reserve to reduce the difference or, if the transient wind farm reserve is insufficient to reduce the difference, additionally or alternatively dispatching the storage reserve to reduce the difference.

14. The method of claim 13, wherein forecasting the wind speed comprises individually forecasting the wind speed for at least some wind turbines in the wind farm.

15. The method of claim 13, wherein determining the storage reserve comprises computing a reserve power available in the storage reserve wherein the storage reserve comprises either one of a centralized energy storage medium for the wind farm or a plurality of local energy storage mediums each coupled to a respective one of the wind turbines.

\* \* \* \* \*